May 6, 1958

D. F. COLE ET AL 2,833,002

VENTED WALL CONSTRUCTION FOR TRAILER

Filed June 17, 1953

INVENTORS
Donald F. Cole,
BY  Clyde F. Wait,

May 6, 1958 D. F. COLE ET AL 2,833,002
VENTED WALL CONSTRUCTION FOR TRAILER
Filed June 17, 1953 2 Sheets-Sheet 2

INVENTORS.
Donald F. Cole,
Clyde F. Wait,
BY

United States Patent Office 2,833,002
Patented May 6, 1958

2,833,002

VENTED WALL CONSTRUCTION FOR TRAILER

Donald F. Cole and Clyde F. Wait, Flint, Mich., assignors to Palace Corporation, Flint, Mich., a corporation of Michigan Application June 17, 1953, Serial No. 362,370

1 Claim. (Cl. 20—4)

This invention relates to ventilation apparatus and, more particularly, to a corrugated metal spacer for providing ventilation between the inner and outer walls of a metal covered trailer.

The problem of moisture condensation between the walls of metal covered trailers has become a source of great concern to the trailer industry. Louvers in the outside walls, holes in the outside walls and various other devices have been utilized with no particular success. Also most types of ventilation systems for trailer walls have required the use of a vent in the roof. This has often necessitated openings directly into the interior of the trailer, around the vent pipe. Such openings have been objectionable to numbers of trailer owners who often stop up the openings, thus destroying the utility of the roof vent.

Another feature of the roof vent which is undesirable is that it causes fairly active convection currents in the trailer walls.

Experience has shown that a less active type of air circulation often called "breathing" is preferable to convection currents, since this type of ventilation does not remove so much heat from the trailer and is more effective in preventing condensation.

Finally, whatever type of ventilation system is used for trailer walls, the practical problem of preventing access to insects must be solved.

An object, therefore, of the present invention is to provide a means for ventilation between the walls of the metal covered trailer which is capable of dispelling the condensation occasioned by the disparity between the inner wall temperature.

Another object of the invention is to provide a ventilation means of the type indicated which shall at the same time be adapted to act as an insect screen for vent openings in the trailer walls.

A further object of the present invention is to provide a ventilating means of the type indicated which shall permit "breathing" in the wall interiors, i. e., ready access to fresh air and which does not give rise to convection currents.

With these and various other objects in view, the invention consists of certain novel features of construction and operation as will be more fully described and particularly pointed out in the specification, drawings and claim appended hereto.

In the drawing:

Figure 4 is a vertical cross section of a portion of the front wall of a trailer utilizing the ventilation system herein disclosed and a portion of the floor section adjacent thereto; and Figure 5 is a longitudinal cross section of a corrugated metal strip embodying the present invention.

Figure 1:
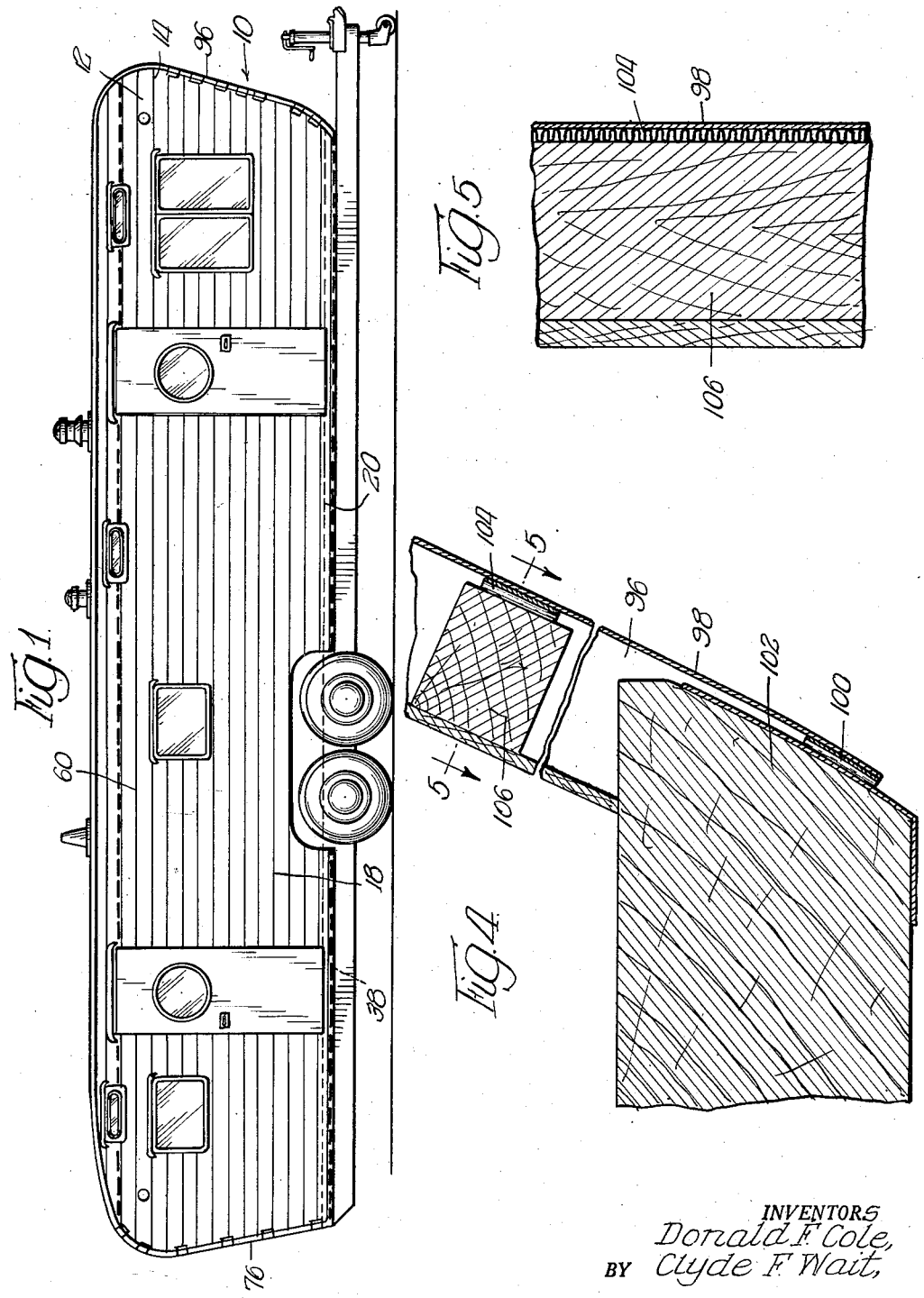
Figure 1 is a side elevation of a trailer provided with the ventilation system herein disclosed illustrating a somewhat diagrammatic view of one possible disposition of vents.
Figure 2:
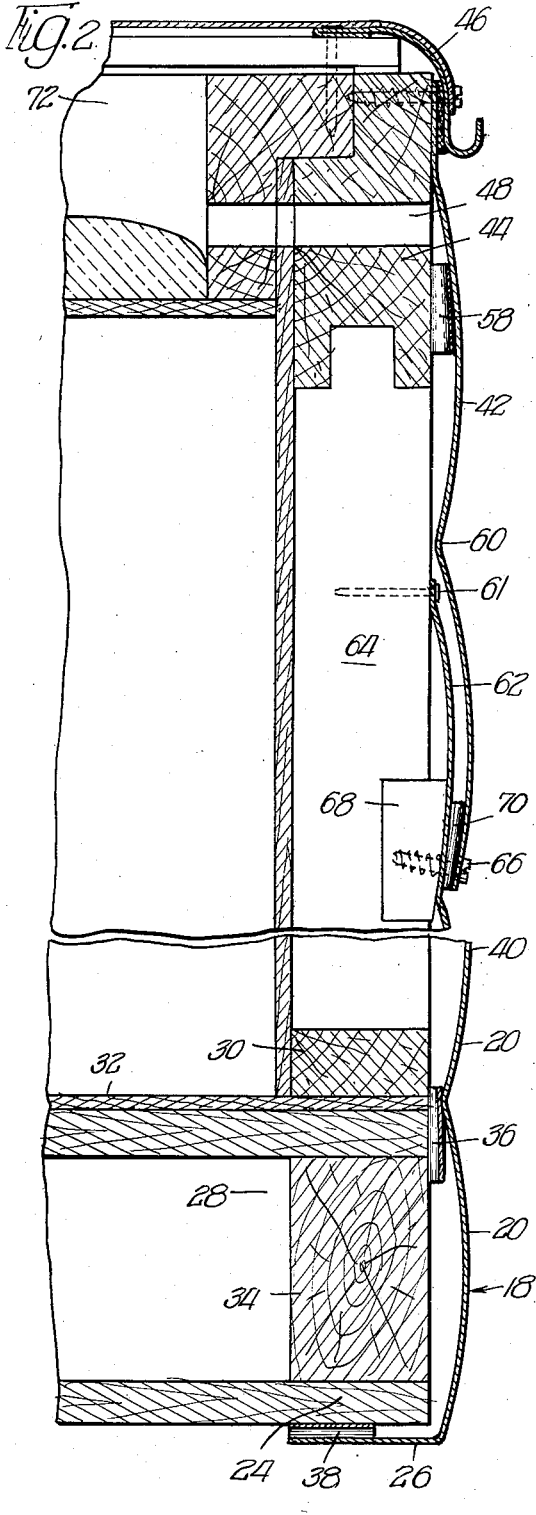
Figure 2 is a transverse cross section of a portion of a trailer utilizing the ventilation system herein disclosed including the side wall and sections of the roof and floor of a trailer adjoining said side wall.

Referring now to Figure 1, the numeral 10 refers generally to a trailer provided with a ventilating system such as hereinafter described. In a preferred form of the invention, sheathing 12 is applied in sections longitudinally to the sides of the trailer 10 and said sheathing is fluted or bowed by means of creases 14 disposed in parallel spaced relation to one another. Strips of metal 104 corrugated vertically as disclosed in Figure 5 are disposed longitudinally internally of said sheathing 12 and act as a means for preventing the sheathing 12 from blocking the free circulation of air in the interior of the trailer walls 18. In the preferred configuration of the sheathing previously referred to, a crease 14 would normally abut the side wall bracing indicated generally by the numeral 28 (see Figure 2) and including the sill plate 30, the floor 32 and floor rail 34. However, the sheathing 20 is prevented from contacting the said bracing 28 by the insertion of a strip of vertically corrugated metal 36 secured longitudinally to said bracing 28.

The sheathing 20 may be extended underneath the base 24 of the side wall 18 as indicated by reference numeral 26. A similar vertically corrugated strip of metal 38 is longitudinally disposed along the base portion of the wall 18 and is adapted to hold the underextending portion of the sheathing 20 in spaced relation to said base portion 24. Thus the strip 38 provides a vent opening along the base portion of the wall 24 which affords a means of ventilating the entire inner portion of the side wall 18 which is covered by the sheathing 20. That is, air entering through the strip or vent 38 may be passed through the vent 36 so as to aerate the portion of the wall 18 which is encased by the upper portion 40 of the sheathing 20, which portion 40 is here disclosed in the preferred arcuate configuration. Another sheathing 42 may be longitudinally disposed along the upper portion of the wall 18 and may be affixed to the uppermost side wall rail 44 beneath the edge of the roof covering 46 by the same fastening means as is used to secure said roof covering 46 to said side rail 44 although any other appropriate means of securing said sheathing 42 may, of course, be utilized.

Apertures 48 are provided in the side wall rails 44 and a vertically corrugated metal strip 58 is secured longitudinally to said side wall rail 44 beneath said apertures 48.

In the preferred embodiment the sheathing 42 is creased along a line 60 and another sheathing 62 is secured to wall studs 64 immediately below the creasing 60 by securing means 61. The sheathing 42 and the sheathing 62 are secured by the same fastening means 66 to a side wall rail 68, and a vertically corrugated metal strip 70 is secured longitudinally by said fastening means 66 between said sheathing 42 and said sheathing 62. The lower edge of the sheathing 42 coincides with the lower edge of the vertically corrugated metal strip 70 so that said strip 70 is adapted to act as a vent for the inner portion of the side wall beneath said sheathing 42 and the metal strip 58 is adapted to pass the air vented through strip 70 into the apertures 48 and thence through the entire inner portion of the roof 72. The method of securing overlapping layers of sheathing disclosed at 61 and 66 may be utilized to cover the entire area of the side wall 18 so that no portion of said side wall 18 will be subject to condensation. As previously described, the vents formed by the metal strips as disclosed in Figure 5 are also adapted to act as an insect screen thus furnishing a sufficient means of ventilation without the usual result of affording access to insects at the same time.

Figure 3:
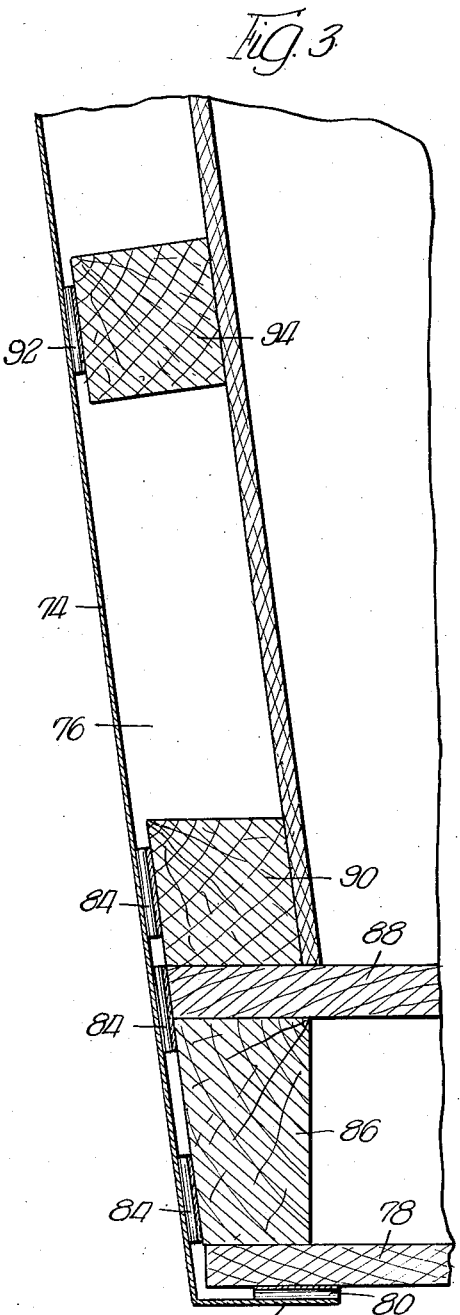
Figure 3 is a vertical cross section of a portion of the rear wall and floor section adjacent thereto of a trailer utilizing the ventilation herein disclosed.

Referring now to Figure 3, a similar method of ventilation is disclosed therein adapted for use on the rear end wall of a trailer. A single sheathing 74 may be utilized to cover the entire rear end wall 76 and may be extended beneath the base portion 78 of said rear wall 76. A vertically corrugated metallic strip 80 is secured longitudinally along said base portion 78 and is adapted to keep the underextending portion 82 of said sheathing 74 in spaced relation to said base portion 78.

A plurality of vertically corrugated metal strips here indicated by reference numeral 84 may be longitudinally secured to the lower bracings of said rear end wall 76 to longitudinally disposed elements along the lower portion of said rear end wall 76, said elements here including a floor rail 86, the edge portion of a floor 88 and a sill plate 90, although, of course, other methods of construction may be adapted for use with the ventilation means herein disclosed. Other vertically corrugated metal strips indicated generally by the numeral 92 are longitudinally secured to the rear end wall rails indicated generally by the numeral 94. Thus, in actual operation air may enter through the vent 80 and may be passed through the vents indicated by the numerals 84 and 92 through the entire inner area of the rear end wall 76 in the manner indicated with reference to the side wall 18.

Referring now to Figure 4, of the drawings, the method of ventilation employed for the front end wall 96 of a trailer 10 is substantially the same as that employed for the rear end wall 94. The entire front end wall 96 is covered by sheathing 98. A vertically corrugated metal strip 100 is longitudinally secured to a floor rail 102, the front face of said floor rail 102 being in the preferred embodiment angularly inclined so as to conform to the configuration of the front end wall of the trailer 10, shown in Figure 1. The lower edge of the sheathing 98 coincides with the lower edge of the corrugated strip 100, the strip 100 holding said sheathing 98 in spaced relation to said floor rail 102 and thus being adapted to act as a vent for the inner portion of the wall 96.

A plurality of vertically corrugated metal strips indicated generally by reference numeral 104 are longitudinally secured to rails for the front end wall referred to generally by reference numeral 106. Thus, in actual operation air entering through the vent 100 may pass through the vents 104 in the manner heretofore disclosed.

Thus, the use of vertically corrugated metal strips in the manner described protects the entire front, rear, sides and roof areas of a trailer from condensation, while at the same time preventing any access to the usual variety of insects.

While we have herein described, and upon the drawings shown, illustrative embodiments of the invention, it is to be understood that the invention is not limited thereto, but may comprehend other constructions, arrangements of parts, details and features without departing from the spirit of the invention.

We claim:

A vented wall construction for a trailer comprising the combination of a plurality of longitudinally disposed overlapping sheathings, a plurality of wall studs, a floor rail extending beneath said wall studs, the underlying flaps of said sheathings being secured at their inner edges to said wall studs when said sheathings are disposed in overlapping relationship, a plurality of vertically corrugated metal strips holding the outer edges of said sheathings in spaced relation to said underlying flaps, a portion of sheathing surrounding the outer side and bottom of said floor rails, a plurality of vertically corrugated metal strips longitudinally disposed to hold said portion of said sheathing in spaced relation to the side of said floor rails, and a plurality of corrugated metal strips secured to the underside of said floor rail and adapted to hold the under portion of said sheathing in spaced relation to the bottom of said floor rail.

References Cited in the file of this patent

UNITED STATES PATENTS

| | | |
|---|---|---|
| 1,426,872 | Hummert | Aug. 22, 1922 |
| 2,287,400 | Wells | June 23, 1942 |
| 2,308,766 | Martinus | Jan. 19, 1943 |
| 2,318,820 | Voigt et al. | May 11, 1943 |
| 2,422,987 | Roberts | June 24, 1947 |
| 2,499,478 | Feser | Mar. 7, 1950 |
| 2,530,919 | Taylor | Nov. 21, 1950 |
| 2,553,881 | Suttles | May 22, 1951 |